(12) United States Patent
Moore (10) Patent No.: US 8,087,609 B2
(45) Date of Patent: Jan. 3, 2012

(54) DYNAMIC HUMAN/WIND POWERED FLYING SUIT

(76) Inventor: David A. Moore, Middletown, CT (US)

( * ) Notice: Subject to any disclaimer, the term of this patent is extended or adjusted under 35 U.S.C. 154(b) by 2307 days.

(21) Appl. No.: 10/888,297

(22) Filed: Jul. 9, 2004

(65) Prior Publication Data

US 2011/0226895 A1 Sep. 22, 2011

(51) Int. Cl.
*B64C 31/04* (2006.01)

(52) U.S. Cl. .......................... 244/64; 244/4 A (58) Field of Classification Search .............. 244/4 A, 244/16, 45 R, 46, 143, 151 R, 153 R, 218, 244/219, 900, 64

See application file for complete search history.

(56) References Cited

U.S. PATENT DOCUMENTS

| | | | | |
|---|---|---|---|---|
| 68,789 | A * | 9/1867 | Quinby | 244/64 |
| 95,513 | A * | 10/1869 | Quinby | 244/64 |
| 132,022 | A * | 10/1872 | Quinby | 244/64 |
| 849,971 | A * | 4/1907 | Brandl | 244/64 |
| 1,257,049 | A * | 2/1918 | Tataryn | 244/142 |
| 2,067,423 | A * | 1/1937 | Sohn et al. | 244/16 |
| 2,213,754 | A * | 9/1940 | Thirring | 280/810 |
| 2,611,558 | A * | 9/1952 | Mackiewicz | 244/28 |
| 4,417,707 | A * | 11/1983 | Leong | 244/11 |
| 5,170,965 | A * | 12/1992 | Yasuda | 244/64 |
| 5,516,193 | A * | 5/1996 | Simpson | 297/252 |

* cited by examiner

*Primary Examiner* — Timothy D Collins
*Assistant Examiner* — Michael A Fabula (57) ABSTRACT

A completely dynamic human powered flying suit comprising of a pair of bat wings and an interconnecting flexible main sheet with the body of the pilot-operator lying on top of and in the center of the non-rigid section of the apparatus when in flight. Each wing has a front section or a wing paddle with supporting spar network and a similar but smaller rear section with the pilot-operator's arms and legs respectively operating the front and rear sections in a swimming motion in order to make lift and thrust. A rear air dam extends along the trailing underside edge of the central part of the apparatus to slow passing air. Large straps extend from wing tip to wing tip at radial intervals down the underside of the aircraft to prevent hyper-extension of the large wing paddle outer ends from bypassing behind the pilot-operator to ensure capturing lift and for the making of thrust. A body harness is provided with quick disconnect clips to hold the pilot-operator onto the suit. A pilot-operator manipulates the rigid and non-rigid sections in concert to radically change the shape of the body wing chord or angle of attack on the wind by bending at the waist and legs to maneuver from high lift shapes to lower lift shapes for takeoff, flight, stunts and landing. A pilot-operator can sweep the wings down and forward or down and backward in a delta shape to bypass wind to safely walk on the ground when wearing the suit into or away from the wind.

9 Claims, 8 Drawing Sheets

FIG. 7

DYNAMIC HUMAN/WIND POWERED FLYING SUIT

RELATED APPLICATIONS

Provisional Application Ser. No. 60/487,392, filed Jul. 15, 2003, entitled Dynamic Human/Wind Powered Flying Suit is the predecessor of the present application and is hearby incorporated herein by reference.

BACKGROUND OF THE INVENTION

Since first seeing birds in flight, man has longed to enjoy the freedom and thrill of soaring above the earth. Human powered flying devices have been proposed through the centuries, however, without notable success.

It is the general object of the present invention to provide the first truly successful human powered flying apparatus.

SUMMARY OF THE INVENTION

A dynamic human/wind powered and controlled flying suit that the human body is provided as the main supporting frame for the lifting wing structure. It is a human body wing. A human being can use wind, any high launching point, towed by any vehicle and using his/her strength to gain height and direction in the air or atmosphere. Additionally, any rapid descent apparatus can create speeds necessary for takeoff and ascent into the air. A physically fit and trained pilot will be able to maintain flight, perform aerobatic climbs, dives, sky tacking, pinpoint landings and a variety of stunts by radically changing wing shape and surface area in a strong wind/air in a swimming motion. Wing shape is changed by manipulating the rigid and non-rigid sections of the aircraft. A pilot can also safely walk around on the ground, somewhat, in windy conditions when wearing the suit into or away from the wind.

This device arises from mans' ancient desire to fly as simply as birds or bats. This device is based on the flight of bats (Chiroptera). Bats are the only flying animals most closely related to human beings in that they are both mammals. Prior problems with earlier attempts were that the pilot's torso and legs were not adequately incorporated into the wing assembly nor were they as dynamic as this device. Earlier attempts, also, relied too much on mechanical technology to gain flight. Bicycle pumps and pulley systems are usually too heavy and awkward to attain simple human/wind powered flight.

The dynamic human/wind powered flying suit is a moveable kite suit that the inventor has named a "Fletcher". A Fletcher has three main parts: 1) a main sheet, consisting of suitable sail fabric, 2) an extending framework of suitable strut material and 3) a harness made of suitable strapping and quick release fasteners or clips. The design or wing shape can be varied/cut in size and shape to accommodate: a) different size pilots and b) different styles of flight desired i.e.: long thin wings for distance and soaring flight and short wide wings for aerobatic stunt flying.

DESCRIPTION OF DRAWINGS

FIG. 1a: shows the moveable sections of the invention.

DESCRIPTION OF PREFERRED EMBODIMENT

Figure 2:
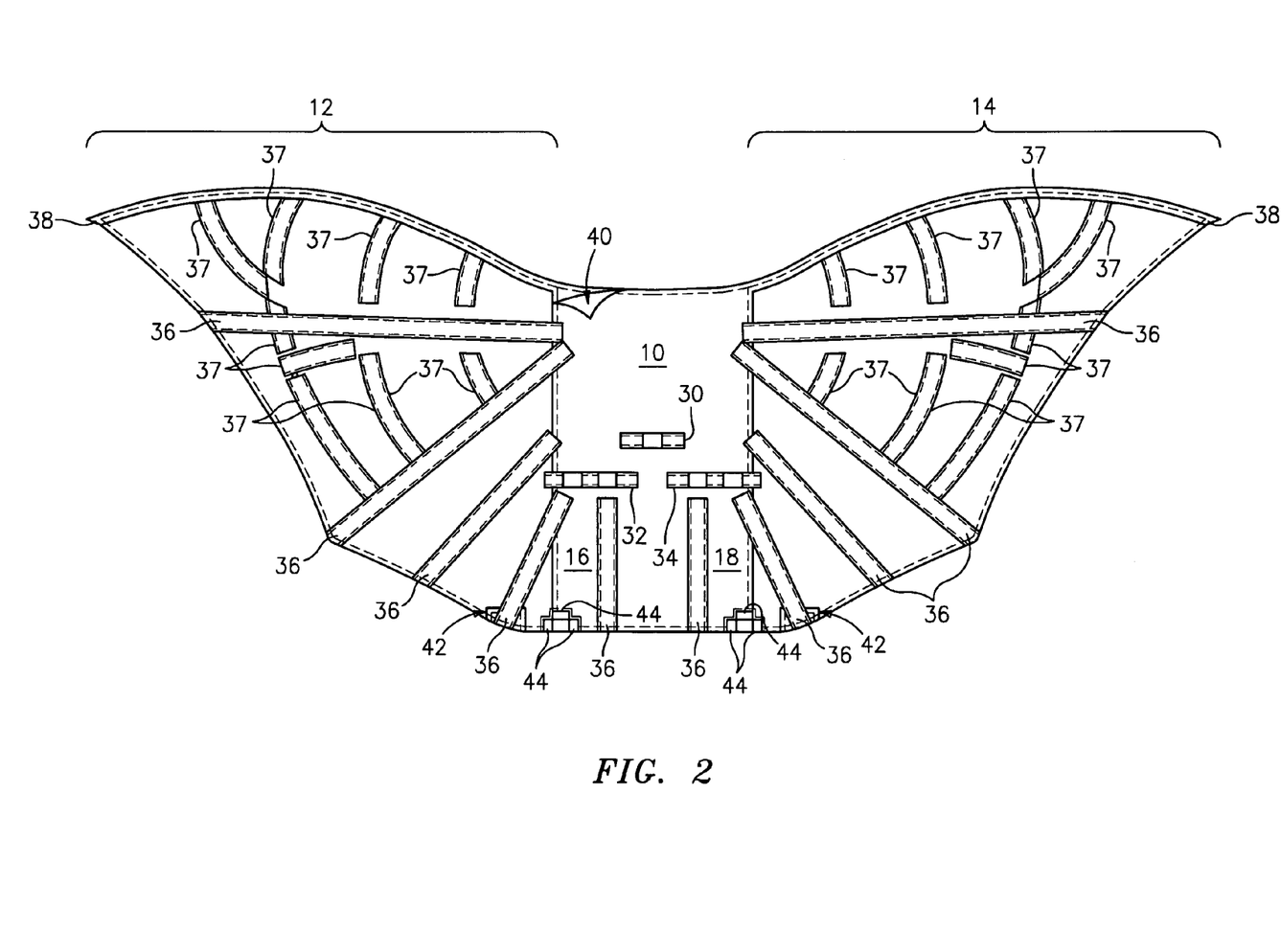
FIG. 2: is a front view with certain parts removed for clarity of illustration.
Figure 2A:
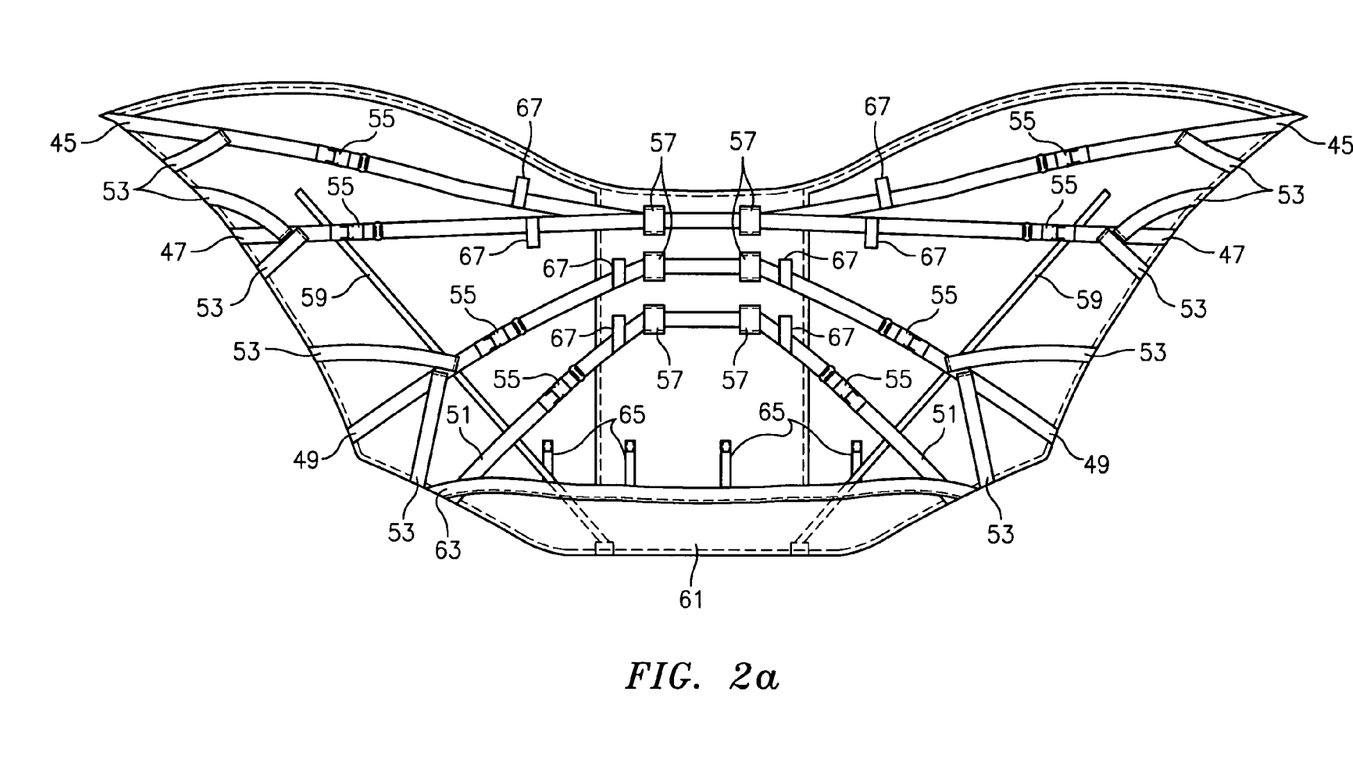
FIG. 2a: is a front view with certain parts removed for clarity of illustration.

A main sheet (10) (FIG. 2) consists of suitable sail fabric of rip stop nylon or Dacron in a wing span of approximately three times the height of the pilot. The main sheet (10) is cut in the general shape of a bat wing that extends from the pilot's shoulders down to the toes. The wing ends taper downwardly and inwardly to the pilot's feet in a bi-laterally symmetrical manner. The center portion of the main sheet (10) is re-enforced by a second strength layer (40) of same sail fabric. All fabric is fastened by suitable high strength sewing thread and sewing techniques. Strut sleeves (36) are strips of same fabric attached to main sheet (10) to hold extending framework struts onto the main sheet (10). The leading edge strut sleeves (38) are made by rolling over the main sheet (10) to form sleeves to accommodate leading edge struts (46). Strut connector sleeves (37) are strips of same fabric attached to the main sheet (10) to hold strut connectors (52,54,60,62,64) onto the main sheet (10). Spat re-enforcing patches (42) (FIG. 2) are used to protect the main sheet (10) from rips and tears from the lower extending framework that impinges on those areas during flight. Stirrup rod sleeves (44) secure lower extending framework to the main sheet (10). Right and left spat support straps (32, 34) hold the extending framework to the main sheet (10). These straps (32, 34) are made of suitable strapping and are remotely attached to the main sheet (10) away from associated leg spat strut sleeves (36) to allow for the sliding variability that occurs during use and operation of the apparatus. Leg spat support straps (32,34) allow for sliding of framework by way of the loops formed in the straps that are not sewn to the main sheet (10). The main sheet (10) has four main straps (45, 47, 49, 51) (FIG. 2) that are attached at one end of the outer most wing perimeter edge, then, passing all the way across the underside of the main sheet (10) through the loops of the main strap supports (57) to the opposite outer most wing perimeter edge and are attached there. The ends of each main strap (45,47,49,51) are attached to the outside end of each wing paddle strut (46,48,50) (FIG. 5) respectively down and across the main sheet (10), as well as, to the free strut (83). The main straps (45,47,49,51) are held to the center of the aircraft by six main strap supports (57) with supports being made of suitable strapping and are sewn to the main sheet (10) in a way to form loops to allow the main straps (45,47,49,51) to slide freely. The first two main straps (45,47) share the same two main strap supports (57). Main straps (49,51) have their own separate sets of main strap supports (57) lower down the centerline of the aircraft. Main strap slide limiters (67) are short pieces of suitable strapping that are attached to the main sheet (10) and to each main strap (45,47,49,51) to keep main straps (45, 47, 49, 51) from sliding too far one way or the other. The main straps (45,47,49,51)

have auxiliary straps (53) attached and radiate outward along the perimeter edge of the main sheet (10) and attach there at frequent intervals. The main straps (45,47,49,51) have main strap adjustors (55) on each end made of suitable nylon belting adjustors. The main sheet (10) has an air dam (61) attached to its lowest perimeter edge to where a pilot's feet would go and is made of suitable sail fabric. The upper end of the air dam (61) is left open at its leading edge to allow it to expand when filled with wind. The air dam (61) has an air dam strap (63) made of suitable strapping and is attached to the leading edge of the air dam (61) and gives strength and shape to the air dam (61). The air dam strap (63) has its ends attached to the main sheet (10) on its perimeter edge along with the air dam (61) just below the free strut (83). The air dam (61) has four air dam stay straps (65) made of suitable strapping and keep the air dam (61) from falling under the apparatus when not in the wind and give it shape when in the wind. The air dam stay straps (65) are attached part way up the main sheet (10) and to the leading edge of the air dam (61) and air dam strap (63). The main sheet (10) has two main sheet stretch straps (59) attached to the stirrup areas (25) and run at angles outward and up to the middle of each wing paddle (12,14). The main sheet stretch straps (59) are made of suitable nylon belting and force the main sheet (10) to expand to its largest surface area when the apparatus is filled with wind. The main sheet stretch straps (59) have suitable nylon belt adjustors to suit for different size pilots.

Figure 3:
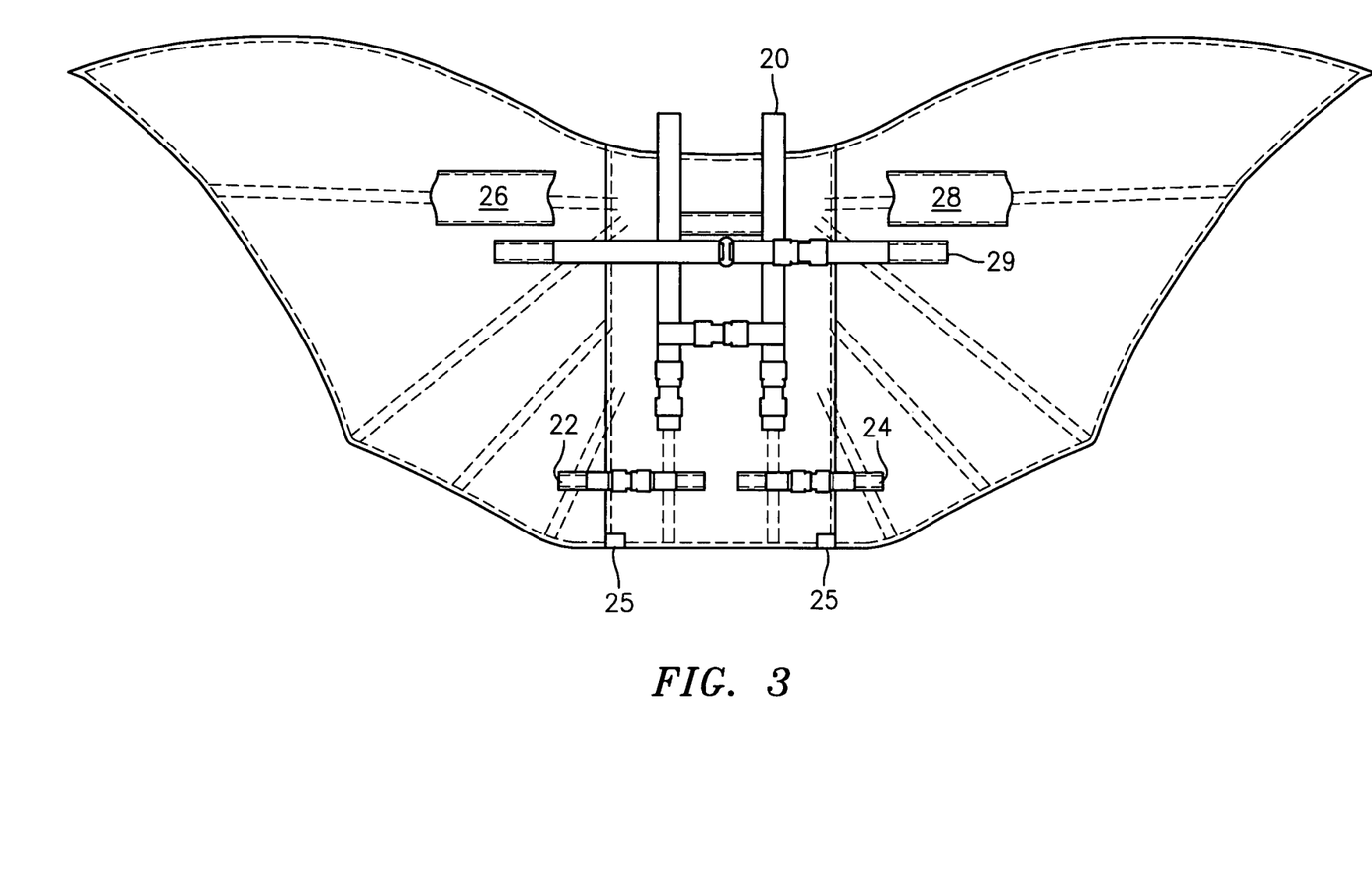
FIG. 3: is a rear view without the pilot.

The backside of the main sheet (10) (FIG. 3) has a harness assembly (20) sewn in to secure the pilot onto the suit. The harness (20) (FIG. 3) is made of suitable strapping with quick disconnect clips for easy donning and doffing of the suit. The pilot's toes extend through the stirrups (25) or toe holes. The pilot's legs are secured to the apparatus by the calf straps left (22) and right (24). The calf straps (22,24) are made of suitable strapping with quick disconnect clips and are sewn to the main sheet (10) and are adjustable for length. The pilot's arms are held in place for use of the suit by way of wing arm sleeves left (26) and right (28) made of same sail fabric and may be re-enforced with suitable strapping. A pilot may gain variability of control of the apparatus by sliding his/her arms inward or outward within the wing arm sleeves (26,28) for different aerobatic maneuvers. The main sheet (10) has a wingspan adjusting strap (29) made of suitable strapping with a quick disconnect clip and adjustor. The wingspan adjusting strap (29) has each end sewn to the main sheet (10) just below the arm sleeves left (26) and right (28) and rides over the harness assembly (20) when in use.

Figure 1:
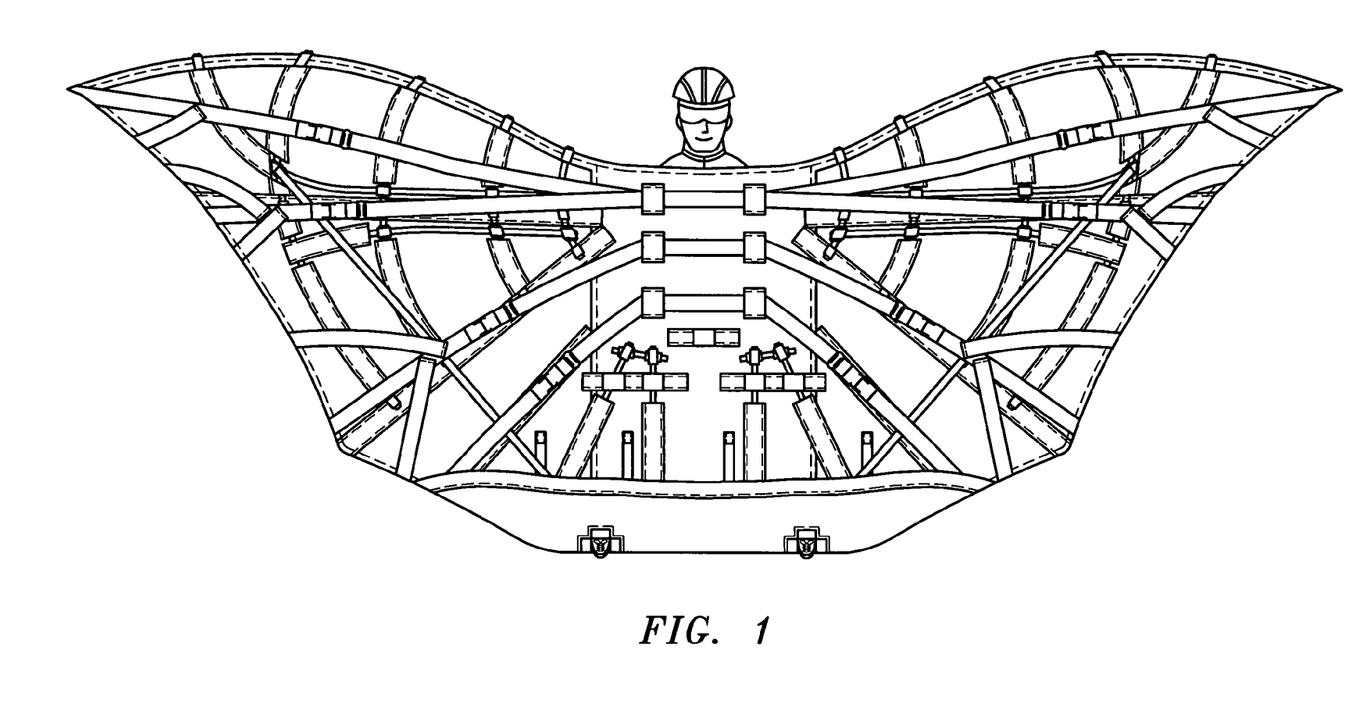
FIG. 1: is a front view of the invention.
Figure 4:
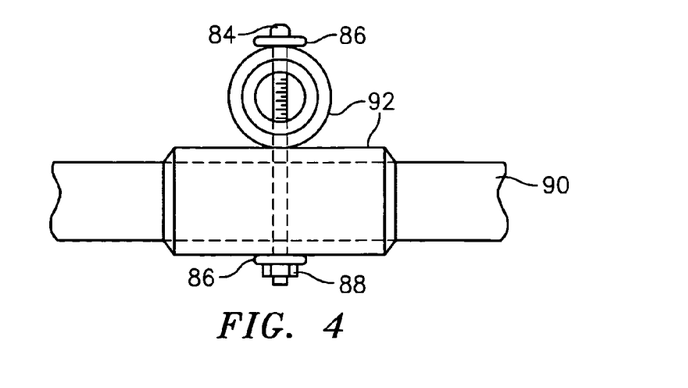
FIG. 4: is an enlarged fragmentary view showing the fastening technique used in the invention.
Figures 5, 5B:
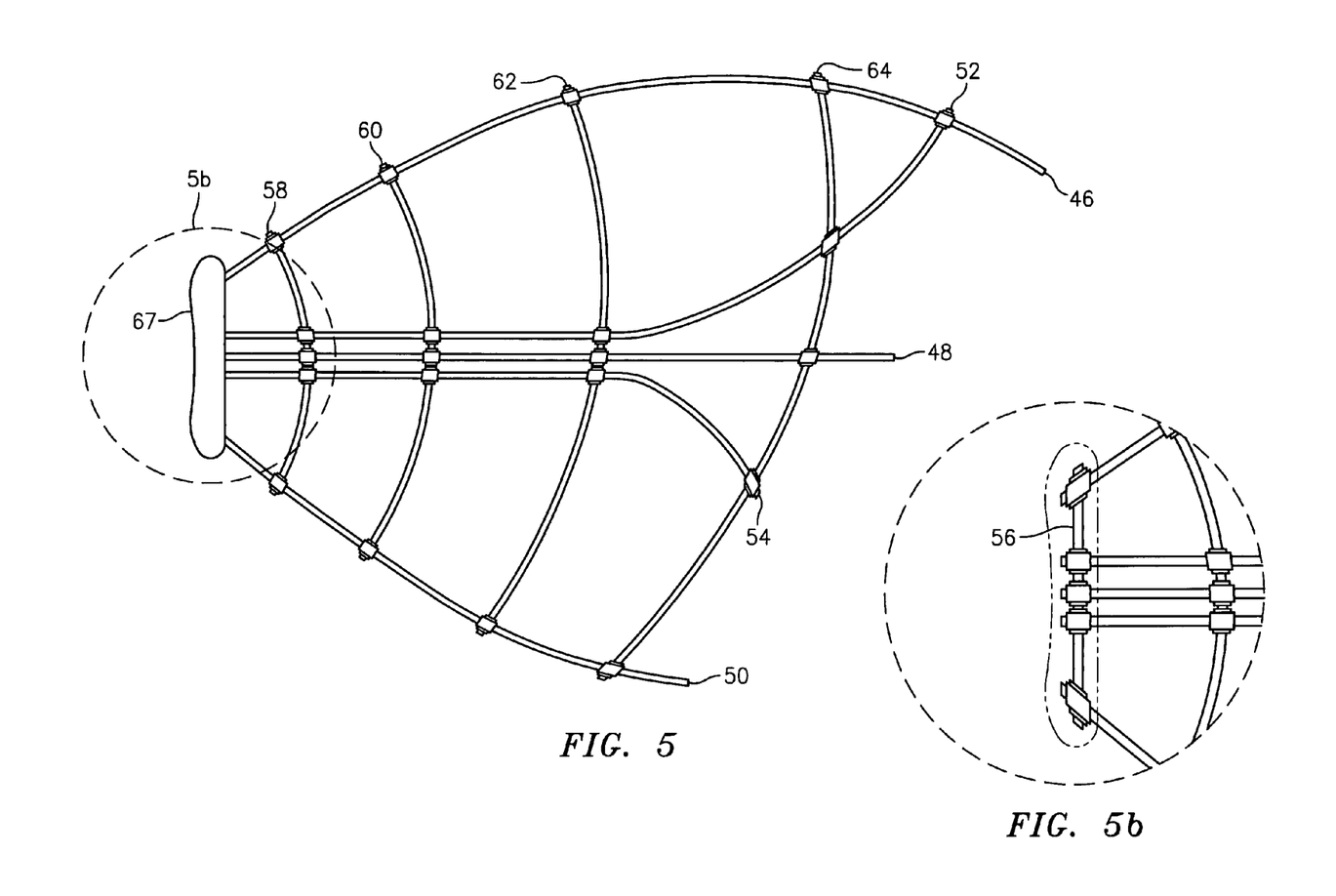
FIG. 5: is a rear view with parts removed showing a representative wing framework.
FIG. 5b: is a fragmentary enlarged rear view with one part removed for clarity of illustration.
Figure 5A:
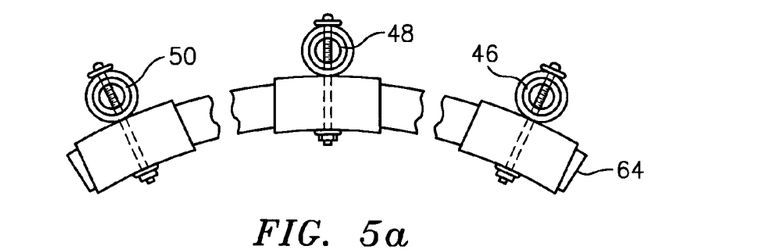
FIG. 5a: is a fragmentary enlarged view showing the general shape in side view for FIG. 5.
Figure 6:
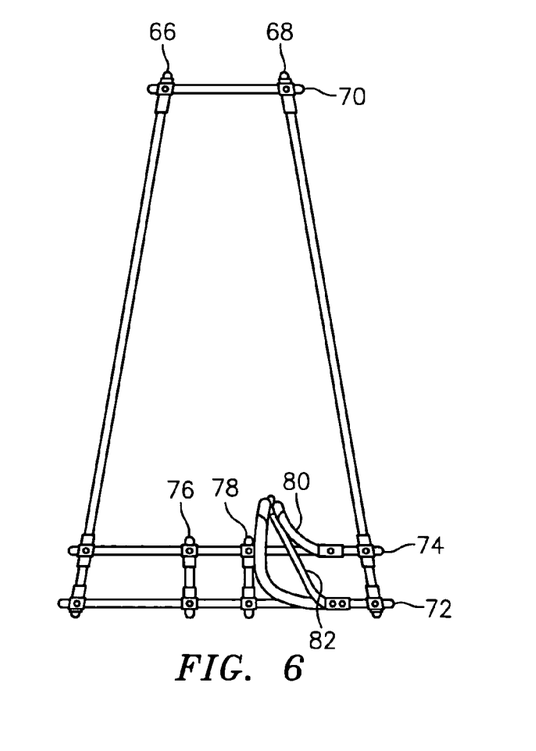
FIG. 6: is a rear view with parts removed for clarity of illustration.
Figure 6A:
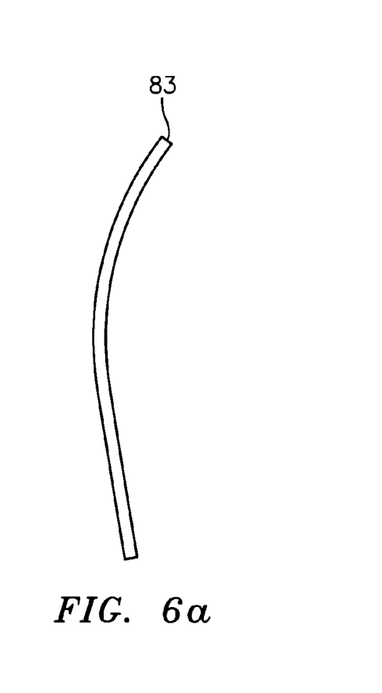
FIG. 6a: is a side view of one part shown removed from the invention for clarity of illustration.

This invention has wing paddle frame assemblies right (14) and left (12) made of suitable strut material (FIG. 5). The extending framework of the wing paddles (12,14) are held together by welding, bonding, collaring or screwing. The screwing method is shown in (FIG. 4) with strut tubes (90) drilled and re-enforced with slightly larger tubing re-enforcing sleeves (92). The tubes are fastened together by machine screws (84) and steel washers (86) under the head of the screws and under the self locking nuts (88). The wing paddle framework (12,14) (FIG. 5) consists of the leading edge strut (46), the center strut (48), the rear strut (50), front strut connector (52), rear strut connector (54), 1rst strut connector (56), $2^{nd}$ strut connector (58), $3^{rd}$ strut connector (60), $4^{th}$ strut connector (62) and the $5^{th}$ strut connector (64). The wing paddle assemblies (12,14) get their curved wing shape and strength (FIG. 5a) from the pre-curved shape of the five strut connectors (56,58,60,62,64). The strut connectors get longer as they are respectively fastened laterally away from the center of the apparatus. The rear strut connector (54) and the forward strut connector (52) give shape and strength to the wing paddle assemblies (12,14), as well as, provide a platform for the pilot's hands and arms to impinge on in order to manipulate the wing paddles (12,14) for flight and maneuverability. The main struts (46,48,50) and connector struts (52, 54,56,58,60,62,64) are all appropriately fastened in their proper order with screw assemblies as shown in (FIG. 4) and (FIG. 5). The inner most portions of the extending framework of the wing paddles (12,14) have an arm cushion (67) made of suitable soft foam rubber that protects the pilot's upper arms from the hard metal and screws that impinge there during flight. The invention also has leg spat assemblies (16,18) (FIG. 1,2). The leg spat assemblies (16,18) increase the amount of surface area of the pilot's legs and feet that impinge on the lower half of the main sheet (10) for control and maneuver. The leg spats left (18) and right (16) are made of the same materials as the wing paddles (12,14) and fastened in the same manner. The leg spats (16,18) contain the stirrups (FIG. 3) (25) that accommodate the pilot's feet and have spurs (FIG. 6) (80) that impinge on the pilot's ankles to prevent the lower half of the main sheet (10) from passing behind the pilot. The spur (80) is supported by the spur brace (82) and is connected to the spat center strut (74) and spat lower strut (72) on the lateral outside of the pilot's ankle area. The spat assemblies (16,18) consist of the spat inner strut (66) and the spat outer strut (68) that extend from the pilot's feet to just above the knee and make up an elongated triangular shape being wider at the lower end to taper toward the upper end. (FIG. 6). The inner and outer spat struts (66,68) are connected in three places by the upper spat connector (70), the center spat connector (74) and the lower spat connector (72) to make up the shape and add strength to the spat assemblies (16,18). The stirrups (25) are formed by the inner stirrup connector (76), the outer stirrup connector (78) and combined with the lower spat connector (72) and the center spat connector (74) will accommodate the pilot's feet or instep. The invention also has two free struts (83) (FIG. 6a) that extend laterally, radially and downwardly from, approximately, the pilot's waist to the outer perimeter edge of the main sheet (10). The free struts (83) are attached to the main sheet (10) by strut sleeves (36) with in the non-rigid portion of the apparatus, half way between the lower end of the wing paddles (12,14) and the lateral outside of the spat assemblies (16,18). The free struts (83) are slightly bent in a wing curve fashion to further give appropriate shape to the main sheet (10) for creating lift. The wing paddle assemblies (12,14) and the spat assemblies (16, 18) are the only rigid portions of the aircraft. All other portions of the main sheet (10) are non-rigid; with note between the leg spat assemblies (16,18).

USE AND OPERATION

To use a dynamic human/wind powered flying suit or "Fletcher" a pilot must 1) be physically fit, especially, in upper body strength and in endurance. A suitable fitness program will have had to be followed for sometime before attempting to fly in this manner. 2) Knowledge of air currents and aerodynamics will lead to a successful and safe flight. A pilot must understand how the Fletcher, and its parts, will react to the forces of wind and human strength placed upon it. 3) A pilot must realize the limits of his/her physical abilities to prevent falls from exhaustion or injury. 4) A pilot must be able to inspect the aircraft for safety and integrity before attempting any flight.

A Fletcher or dynamic human/wind powered flying suit has rigid and non-rigid sections. The wing paddle assemblies (12,14) and the leg spat assemblies (16,18) are the rigid sections and are reciprocally shaped for left and right. The wing paddles (12,14) are made of struts (46,48,50) and their supporting strut connectors (52,54,56,60,62,64), parts of the main sheet (10), the leading edge strut sleeves (38), corresponding strut sleeves (36), Strut connector sleeves (37) and arm sleeves (26,28). The leg spat assemblies (16,18) consist of stirrups (25), spurs (80), spur braces (82), spat struts (66, 68), spat strut connectors (70,72,74), stirrup connectors (76, 78), portions of the main sheet (10), spat support straps (32, 34), corresponding strut sleeves (36), stirrup rod sleeves (44) and spat re-enforcing patches (42). A pilot must use these rigid assemblies together with the remaining non-rigid sections to control the shape of the body wing he/she is forming for the desired maneuvers. By radically changing the shape of the body wing a pilot controls the amount of air impinged on the wing by manipulating the size and shape of: the wing surface area, angle of attack on the wind and wing chord shape. The Fletcher has two important positions: 1) fully closed or the feathered position and 2) fully open or the spread eagle position. The following paragraphs explain: 1) donning, 2) launching, 3) flying, 4) landing, 5) doffing and 6) inspection of the dynamic human/wind powered flying suit.

Figure 7:
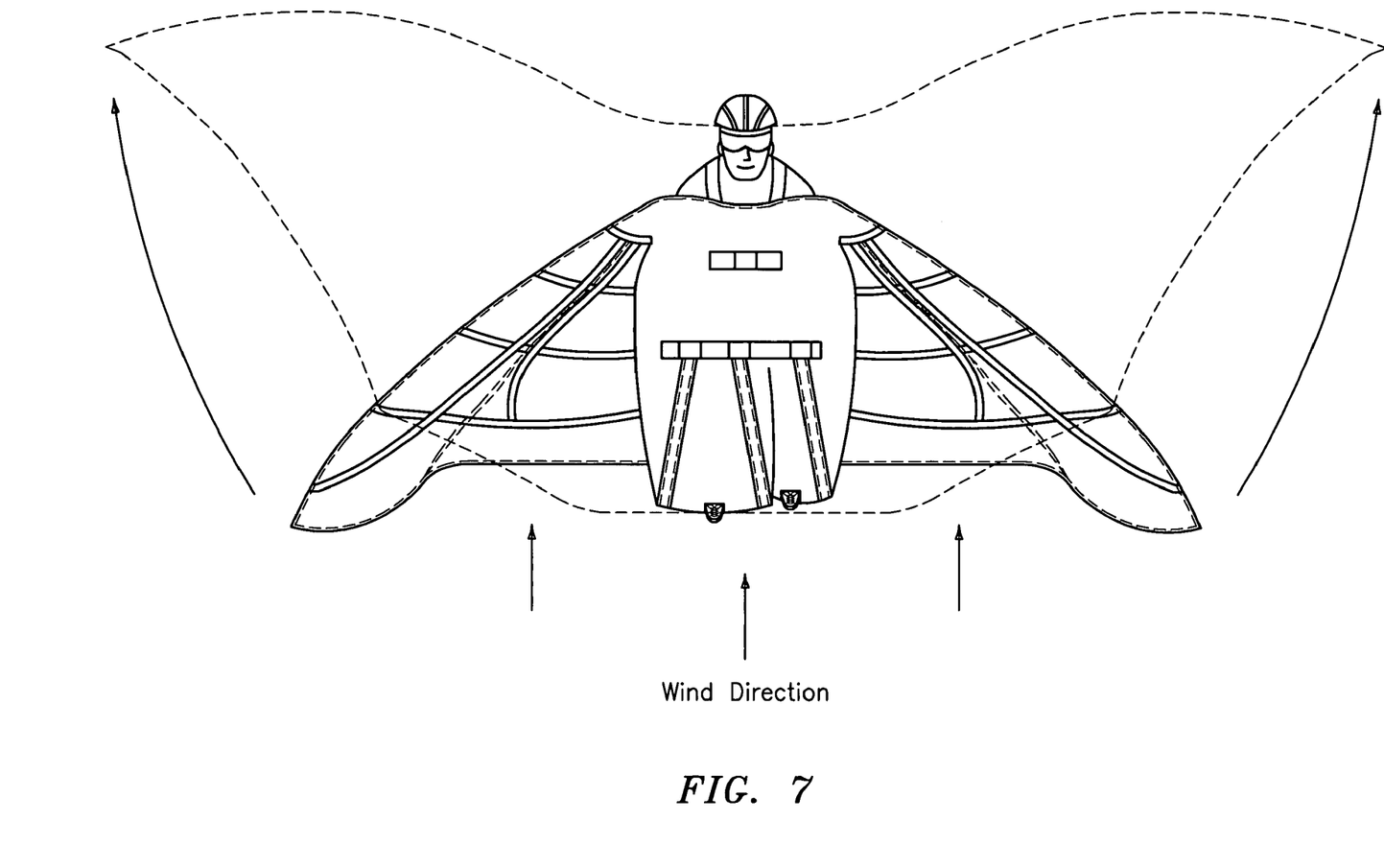
FIG. 7: is a front view of the invention with a pilot to illustrate the two most important and extreme moveable positions of the invention.

DONNING: The suit is carried to a launch point and is donned in accordance with the immediate conditions therein. In windy conditions the suit is laid on the ground, harness side up, in front of the pilot with pilot's back to the wind. The stirrups (25) are at the pilot's feet. Other people can be used as helpers for safety and ease of donning to hold the wing paddles (12,14) down. The pilot then places a foot into a stirrup (25) and lifts the upper end of that spat assembly (16 or 18) into a vertical position in front of the leg to then fasten the calf strap (22 or 24) behind that leg with the quick disconnect clip. The same procedure is then used for the second leg. The pilot will then grasp the shoulder portions of the harness (20) and place the shoulder straps over the head and onto the shoulders. The waist strap portion of the harness (20) is then fastened by a quick disconnect clip. At this point, the pilot will stand and let the wing paddles (12,14) swing to blow freely in front of him/her. Helpers can continue to assist to control wing paddles (12,14). At this point the aircraft is not creating any lift. The pilot will then fasten the left and right groin strap portions of the harness (20) by the two quick disconnect clips behind each leg. The pilot then places hands and arms into the arm sleeves (26,28) while still allowing the wing paddles (12,14) to stay forward. If the wind is very strong the pilot may have to crouch, (bend at the waist and knees), to turn around to one side while not letting the wing paddles (12,14) create any lift by the air streaming by. Once facing into the wind the pilot will immediately have to form the feathered position. In the feathered position the pilot is crouched with the wing paddles (12,14) swung in a delta shape to flow behind his/her body and one leg spat (16 or 18) behind the other (FIG. 7). The apparatus creates very little thrust in the feathered position. The feathered position is the pre-launch position or posture. Once the suit is donned and the pilot assumes the feathered position the pilot may safely walk to the desired launch point into the wind. If so necessary, the wing paddles (12,14) may be to let to swing in front of the pilot to safely walk with the wind. Another way to don the suit is to lay it down on the ground facing the wind. Soft weights can be used to hold the wing paddles (12,14) down to keep them from lifting out of control in the wind. The pilot will then crawl up the suit and fasten all harness clips (20) and calf straps (22,24) in the prone position (facing down). The pilot will then place his/her feet into the stirrups (25) and, finally, place hands and forearms into the arm sleeves (26,28). When ready, the pilot will rise to the feathered position as the soft weights are shaken off and the wing paddles (12,14) to be let to swing backward to delta behind the body.

LAUNCHING: Once the pilot is in the suit, has assumed the feathered position (FIG. 7) and is facing into the wind the Fletcher can be launched in a variety of ways. A tether (rope) can be attached to the center of gravity attachment strap (30) (FIG. 2) and either fastened to the ground or to a tow vehicle. If there is no existing wind, a sliding or rolling launch platform will be needed to allow for enough air speed to take off the ground when using a tow vehicle. A high launch point can be used into the wind. The Fletcher can be launched with no tether into a suitable wind. And, lastly, by assuming the feathered position on a rapidly descending vehicle such as a bicycle, roller blades or skis going down hill until enough air speed is attained for flight. To actually take off, the pilot thrusts his/her arms, in the wing paddles (12,14), outward and forward to assume the spread eagle or fully open position (FIG. 7). At the same time the leg spats (16,18) are kicked wide and the outside of the pilot's ankles will impinge on the spurs (80) (FIG. 6) to capture the wind by using the rigid sections to keep the non-rigid portions of the main sheet (10) from passing behind him/her. A pilot must go, immediately, from the smallest aerodynamic position to the largest aerodynamic position; from low surface area on the wind to maximum surface area on the wind. A good jump can be used to assist in launching.

FLYING: Once off the ground with the pilot and suit in the proper spread eagle position, horizontal in the air, a pilot can create more lift by continually thrusting the apparatus in a humping or swimming motion similar to the butterfly swimming stroke. As the pilot thrusts his/her body, the increased airflow over the wings makes high pressure "balloons" under the wings and low pressure areas above the wings creating greater lift (Bernoulli's Principle). The high pressure "balloons" are made with each thrust and passed down the pilot's body toward the leg spats (16,18) by pushing down on the wing paddles (12,14) and then kicked off of the high pressure "balloons" by using the leg spats (16,18) in an undulating motion of the body. The air dam (61) helps to keep the high pressure "balloon" under the aircraft and, thus, prevents useable thrust from being lost by bypassing under and away from the apparatus. The main straps (45,47,49,51) are shorter than the main sheet (10) and will not allow the wing paddles (12,14) to hyper-extend at the outer ends behind the pilot to lose lift. Once fully extended in the wind the entire apparatus will bow into an umbrella or parachute shape with the pilot in the center. The main strap adjustors (55) are used to shorten or lengthen the main straps (45,47,49,51) to accommodate the different body forms of pilots and for different desired types of aerial performance. Climbing is accomplished in a rapid succession of thrusts to a desired height or until the pilot's endurance is compromised. Simple gliding flight can be maintained by the pilot holding the entire perimeter of the main sheet (10) taut while remaining horizontal in the wind. Slight changes in the angle of attack on the air current by manipulating the wing paddles (12,14) and/or leg spats (16, 18) will give the pilot control to stay oriented and horizontal in the wind. Traveling a distance is accomplished by a pilot thrusting, continually, directly into the wind or at slight angles to the wind called tacking. Another method of traveling is to, either, climb to a desired altitude by thrusting or by letting strong air currents make constant lift to climb and then diving at slight angles to the wind toward the desired direction. Diving can be performed by letting the wing paddles (12,14) swing in any variation of a delta or toward the feathered position to the desired speed, altitude and/or direction. A dive can also be done by bringing the leg spats (16,18) together, which will effect the wing paddles' (12,14) position. A pilot must know the limits of his/her own strength and endurance to ensure being able to pull out of a dive. Hovering, as birds do in a strong wind, is accomplished by an impending dive. An airborne pilot can hover in one spot by finding the equilibrium of lift and gravity to perform an impending dive or hover in a moving air column. An impending dive is when a slight dive attitude is achieved with no loss in altitude. In a lesser wind, a hover can be maintained with large or small, rapid or slow thrusts of the wing paddles (12,14) or kicks with the leg spats (16,18). Another way to descend is to lift both leg spats (16,18), by the pilot bending at the knees, and dumping the high pressure "balloon" from under the main sheet (10) and, thus, release thrust. A great variety of aerobatic stunts can be performed by the myriad of different wing shapes formed by the posturing of the pilot and thrusting in combination with different wind conditions. Many new stunts will be invented by creative and physically fit pilots.

LANDING: Landing a Fletcher is the reverse procedure as for donning. The pilot decides on a spot to land and faces the aircraft into the wind in the fully open position; a few hard thrusts of the wing paddles (12,14) can be performed to slow the aircraft. The pilot slows to a safe landing speed and touches his/her feet to the ground and then immediately assumes the feathered position. A feathered position is necessary to prevent the pilot from being knocked down by the wind once touch down has occurred. It is possible to take short running steps once on the ground to continue slowing down and/or to regain balance as the feathered position is assumed.

DOFFING: Doffing the Fletcher is the reverse procedure as for donning. The pilot turns, in the feathered position, his/her back to the wind and allows the wing paddles (12,14) to swing to the front of the pilot's body; helpers can be used to control the apparatus in strong winds. The pilot's hands and arms are withdrawn from the arm sleeves (26,28) and then the waist and groin straps of the harness (20) are unclipped. The harness (20) is lifted off of the shoulders and the pilot's head is pulled out from within. The upper part of the apparatus can then be let to fall safely to the ground. Finally, the calf straps (22,24) are unfastened for the pilot to step free of the apparatus. The pilot should keep a good grasp on the harness (20) and beware of the wing paddles (12,14) for they may catch wind and cause injury as they fly out of control. The pilot can then lay the aircraft flat on the ground, fold it in half with one wing paddle (12,14) over the other and carefully carry it out of the windy conditions.

INSPECTION: For maximum safety, a pilot must always do a pre-flight and a post-flight inspection of the aircraft/apparatus. The main sheet (10) is inspected for integrity of all attached fabric for rips, tears and general deterioration. All stitching is inspected for security. The harness (20) and all strapping must be examined for fast stitching and wear. The quick disconnect clips are inspected for cracks and fast hold. All extending framework is inspected for bends, breaks, cracks and loose or missing hardware.

The invention claimed is:

1. A human powered flying suit comprising:
    a pair of oppositely projecting wings, each wing having a configuration similar to the wing of a bat, a substantial portion thereof, extending rearwards from the leading edge, constructed from flexible sheet material supported by a network of interconnected spars, the network of spars having a shape forming a generally triangular paddle with its apex adjacent the pilot operator;
    a releasable attachment means for the arms of the pilot-operator respectively connecting the paddles to the arms of the pilot-operator for manipulation of the paddles independently or cooperatively;
    a flat flexible body portion interconnecting the wings having a means for releasable attachment to the body of a human pilot-operator, wherein the backside of the body portion has a harness assembly to secure the pilot onto the suit;
    at least two straps placed radially and extending laterally from an attachment point at an outer perimeter edge of one wing, passing across the underside of the body portion to an attachment point at an outer perimeter edge of the opposite wing, wherein the straps are adjustable to keep the wing ends from hyper-extending behind the pilot-operator; and
    a leg spat for each lower leg and foot of the pilot-operator, each spat being attached to a rear portion of its respective adjacent wing and movable under control of the pilot-operator to assist in control of the flying suit.

2. A human powered flying suit as set forth in claim 1 wherein the paddles extend throughout more than half the area of their respective wings.

3. A human powered flying suit as set forth in claim 1 wherein the leg and foot spats are constructed of flexible sheet material with spar networks supporting the same and facilitating and emphasizing the control movement thereof.

4. A human powered flying suit as set forth in claim 1 wherein a portion of each wing rearwardly of its paddle and forwardly of its leg spat, as well as, between said paddles and spats is of flexible sheet material.

5. A human powered flying suit as set forth in claim 1 wherein the flying suit has a narrow elongated air dam along the central underside portion of its trailing edge.

6. The human powered flying suit of claim 1 wherein the at least two straps comprises at least four straps, wherein at least two straps are at the approximate chest level of the pilot-operator, at least one strap is at the approximate waist level of the pilot-operator, and at least one strap is at the approximate thigh level of the pilot-operator.

7. The human powered flying suit of claim 1 wherein the pilot-operator can walk on the ground during windy conditions, while in the suit, by allowing the wing paddle sections to either stream behind or in front of the pilot-operator.

8. The human powered flying suit of claim 1 wherein a full body wing is formed from the shoulders to the toes of the pilot-operator, the full body wing being adjustable to increase camber along the entire chord when the pilot-operator bends at the waist, and adjustable to reduce camber along the entire chord when the pilot-operator bends at the knees and straightens at the waist.

9. The human powered flying suit of claim 1 further comprising a wingspan adjusting strap connected to the apexes of the wing paddles and passing over top of the pilot-operator harness assembly.

\* \* \* \* \*